(12) United States Patent
Chen

(10) Patent No.: US 8,558,819 B2
(45) Date of Patent: Oct. 15, 2013

(54) ELECTRONIC APPARATUS AND RESET METHOD OF THE SAME

(75) Inventor: Chih-Jung Chen, Taipei (TW)

(73) Assignee: Inventec Corporation, Taipei (TW)

( * ) Notice: Subject to any disclaimer, the term of this patent is extended or adjusted under 35 U.S.C. 154(b) by 386 days.

(21) Appl. No.: 13/025,175

(22) Filed: Feb. 11, 2011

(65) Prior Publication Data

US 2012/0133619 A1 May 31, 2012

(30) Foreign Application Priority Data

Nov. 26, 2010 (TW) .............................. 99223037 U

(51) Int. Cl.
*G06F 3/033* (2013.01)
(52) U.S. Cl.
USPC ...................................... 345/179; 178/19.01
(58) Field of Classification Search
USPC .................... 345/179, 156; 178/19.03, 19.04; 179/19.01–19.05
See application file for complete search history.

(56) References Cited

U.S. PATENT DOCUMENTS

| 6,473,076 | B1 * | 10/2002 | Thompson et al. | ........... 345/179 |
| 6,681,333 | B1 * | 1/2004 | Cho | ............... 713/300 |
| 2004/0080916 | A1 * | 4/2004 | Hsu et al. | ...................... 361/727 |
| 2004/0108997 | A1 * | 6/2004 | Lee | ............... 345/179 |
| 2005/0168500 | A1 * | 8/2005 | Lee | ............... 345/905 |
| 2006/0109617 | A1 * | 5/2006 | Chen et al. | .................... 361/683 |

FOREIGN PATENT DOCUMENTS

| TW | 526980 | 4/2003 |
| TW | 201021663 | 6/2010 |

* cited by examiner

*Primary Examiner* — Koosha Sharifi-Tafreshi
(74) *Attorney, Agent, or Firm* — CKC & Partners Co., Ltd.

(57) ABSTRACT

An electronic apparatus including a main body and a stylus is provided. The main body includes a containing trench having a bulge and a reset button. The stylus includes a stylus body, a stylus front end and a stylus rear end. A surrounding trench structure of the stylus body has a first end and a second end connected to a first stylus body and a second stylus of the stylus body respectively, wherein the cross section area of the first end is smaller than the same of the second end. The stylus front end passes into the containing trench to perform a first displacement to a first position, and then to perform a second displacement to a second position by pressing the stylus rear end to make the surrounding trench structure slide over the bulge such that the stylus tip touches the reset button to reset the electronic apparatus.

12 Claims, 5 Drawing Sheets

301 placing a stylus front end of a stylus to a containing trench of the electronic apparatus via a second opening

302 performing a first displacement in the containing trench such that the stylus moves to a first position to make the bulge of the containing trench buckles in the surrounding trench structure of the stylus

303 performing a second displacement by exerting a force on a stylus rear end such that the surrounding trench structure slides over the bulge and thus the stylus tip touches a reset button separated for a certain distance

304 rebounding the stylus to the first position by the pressure between the second end of the surrounding trench structure and the bulge

Fig. 3

ELECTRONIC APPARATUS AND RESET METHOD OF THE SAME

RELATED APPLICATIONS

This application claims priority to Taiwan Application Serial Number 099223037, filed Nov. 26, 2010, which is herein incorporated by reference.

BACKGROUND

1. Field of Invention

The invention relates to an electronic apparatus. More particularly, the invention relates to an electronic apparatus and a reset method of the same.

2. Description of Related Art

An electronic apparatus, such as a handheld mobile communication apparatus, a personal digital assistant or a computer host device, plays an important role in the communication and information exchange in the modern society. Due to the increasing complexity of the electronic apparatus, when the system error occurs or the system shut down, the system usually needs to be reset so as to restore the normal operation. Generally, to reset the system in the conventional handheld mobile apparatus, the user should open the battery lid, take out the stylus in the containing trench of the main body, and then press down the reset button under the battery lid via the stylus tip.

This design often brings inconvenience. In addition to the complicated and time consuming steps, the steps of opening and closing the battery lid for resetting easily cause the battery lid to wear out.

Therefore, there is a problem to be solved in this field on how to design a novel electronic apparatus with a reset mechanism and a reset method of the same, thereby achieving the reset of the electronic apparatus in a simple way.

SUMMARY

Accordingly, an aspect of the present disclosure is to provide an electronic apparatus with a reset mechanism. The electronic apparatus includes a main body and a stylus. The main body includes a containing trench and a reset button. The containing trench has a first opening and a second opening, and the containing trench includes a bulge. The reset button is is separated from the first opening for a certain distance. The stylus includes a stylus body, a stylus front end and a stylus rear end. The stylus body includes a first stylus body, a second stylus body and a surrounding trench structure. A first end of the surrounding trench structure is connected to the first stylus body and a second end of the surrounding trench structure is connected to the second stylus body, in which the cross section area of the first end is smaller than the cross section area of the second end. The stylus front end stretches from the first stylus body to a stylus tip. The stylus rear end is connected to the second stylus body. The stylus front end passes into the containing trench via the second opening to perform a first displacement to a first position such that the bulge buckles in the surrounding trench structure to enable the stylus to be placed inside the containing trench, and then to perform a second displacement to a second position by pressing the stylus rear end to make the surrounding trench structure slide over the bulge such that the stylus tip touches the reset button via the first opening to reset the electronic apparatus.

Another aspect of the present disclosure is to provide an electronic apparatus reset method. The reset method includes placing in the stylus front end of the stylus via a second opening of a containing trench of a main body of an electronic apparatus, wherein the stylus front end stretches from a first stylus body of a stylus body of the stylus to a stylus tip. The stylus performs a first displacement in the containing trench to a first position such that the bulge in the containing trench buckles in the surrounding trench structure of the stylus, wherein the first end of the surrounding trench structure is connected to a first stylus body, the second end is connected to a second stylus body of the stylus body of the stylus, in which the cross section area of the first end is smaller than the cross section area of the second end. The stylus rear end connected to the second stylus body is exerted with a force to perform a second displacement to a second position by making the surrounding trench structure slide over the bulge, such that the tip touches a reset button separated from a first opening of the containing trench for a certain distance via the first opening to reset the electronic apparatus.

BRIEF DESCRIPTION OF THE DRAWINGS

The invention can be more fully understood by reading the following detailed description of the embodiment, with reference made to the accompanying drawings as follows:

FIG. 3 is a flow chart of an electronic apparatus reset method according to an embodiment;

DETAILED DESCRIPTION

Figure 1:
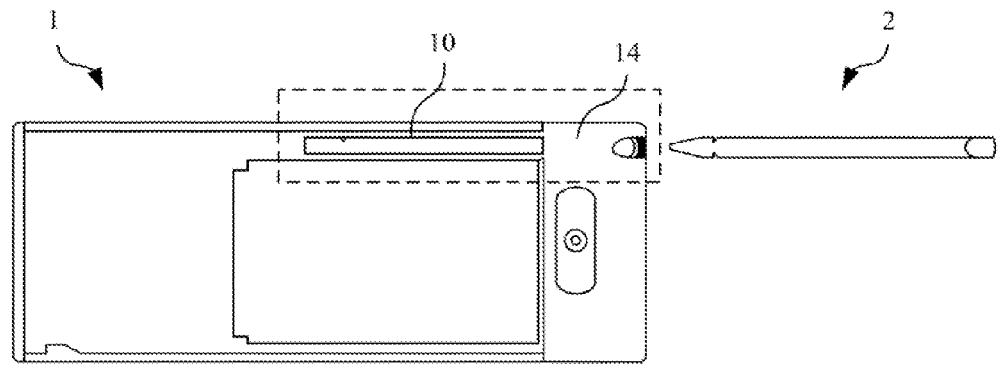
FIG. 1 is a schematic view of electronic apparatus with a reset mechanism according to an embodiment of the present disclosure.

FIG. 1 is a schematic view of an electronic apparatus with a reset mechanism according to an embodiment of the present disclosure. Referring to FIG. 1, the electronic apparatus includes a main body 1 and a stylus 2.

Figure 2A:
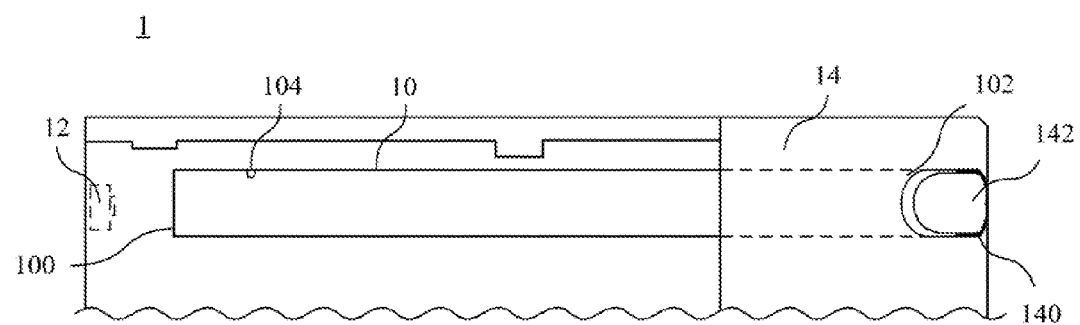
FIG. 2A is an enlarged view of an area enclosed by the dashed line of a main body in FIG. 1.
Figure 2B:
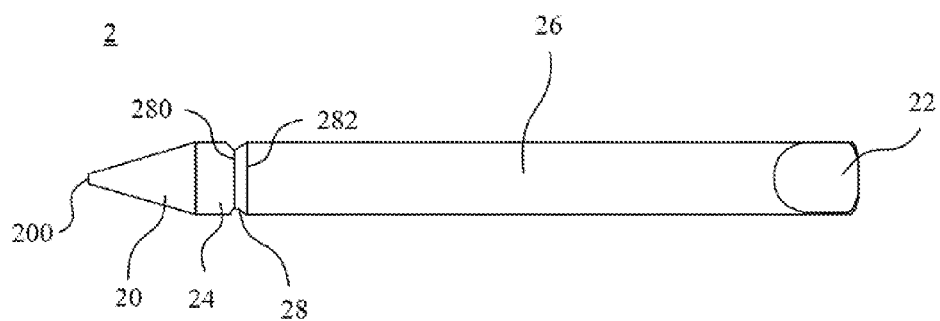
FIG. 2B is an enlarged view of a stylus in FIG. 1.

FIG. 2A is an enlarged view of an area enclosed by the dashed line of a main body in FIGS. 1 and FIG. 2B is an enlarged view of a stylus 2 in FIG. 1. Referring to FIGS. 2A and 28 at the same time, the main body 1 includes a containing trench 10, a reset button 12 and a protection cover 14. The containing trench 10 has a first opening 100 and a second opening 102, in which the second opening 102 is contiguous to a placing hole 140 of the protection cover 14. The containing trench 10 further includes a bulge 104. The reset button 12 is separated from the first opening 100 for a certain distance, and when the reset button 12 is touched, the reset button 12 resets the electronic apparatus. In an embodiment, the main body 1 may be connected to the protection cover 14 by a battery lid (not shown) to cover the containing trench 10 and other regions such that the elements under cover are protected.

The stylus 2 includes a stylus body, a stylus front end 20 and a stylus rear end 22. The stylus body includes a first stylus body 24, a second stylus body 26 and a surrounding trench structure 28. A first end 280 of the surrounding trench structure 28 is connected to the first stylus body 24, a second end 282 of that is connected to the second stylus body 26, in which the cross section area of the first end 280 is smaller than the cross section area of the second end 282. The stylus front end 20 stretches from the first stylus body 24 to a stylus tip 200. The stylus rear end 22 is connected to the second stylus body 26.

Figure 4A:
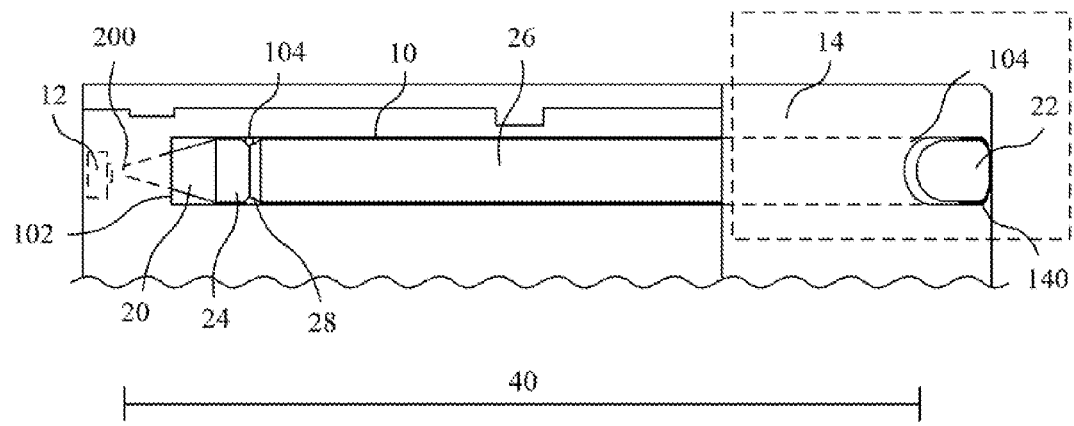
FIG. 4A and FIG. 4B are schematic views of performing steps of an electronic apparatus reset method in FIG. 3 by an electronic apparatus.
Figure 4B:
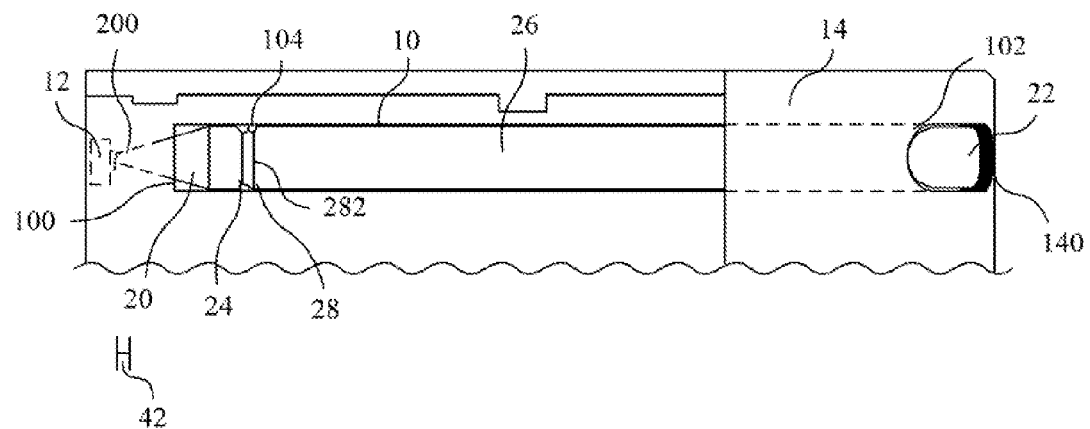

Referring to FIGS. 3, 4A and 4B at the same time. FIG. 3 is a flow chart of an electronic apparatus reset method according to an embodiment of this disclosure. The electronic apparatus reset method may be adapted to the electronic apparatus including the main body 1 and the stylus 2 depicted in FIGS. 1, 2A and 2B. FIGS. 4A and 4B are schematic views of performing the steps of an electronic apparatus reset method in FIG. 3 by the electronic apparatus.

In step 301, a stylus front end 20 of the stylus 2 is placed to a containing trench 10 of the electronic apparatus via a second opening 102. In step 302, the stylus 2 performs a first displacement 40 in the containing trench 10 to a first position, as shown in FIG. 4A, and now the bulge 104 of the containing trench 10 buckles in the surrounding trench structure 28 of the stylus 2. In step 303, a second displacement 42 is performed to a second position by exerting a force on a stylus rear end 22 such that the surrounding trench structure 28 slides over the bulge 104, as shown in FIG. 4B, and thus the stylus tip 200 touches a reset button 12 separated from the first opening 100 for a certain distance via the first opening 100 of the containing trench 10 to reset the electronic apparatus.

Then, in step 304, after the stylus tip 200 touches the reset button 12, the stylus 2 is rebounded to the first position by the pressure between the second end 282 of the surrounding trench structure 28 and the bulge 104 of the containing trench 10.

In an embodiment, the second end 282 of the surrounding trench structure 28 stretches at a first slope to the first end 280, and the stylus front end 20 stretches at a second slope from the first stylus body 24 to a stylus tip 200, in which the first slope is greater than the second slope. When the first displacement 40 is performed, the stylus front end 20 with a small slope slides over the bulge 104 by a gentle force. As the surrounding trench structure 28 has a large slope, the surrounding trench structure 28 needs a large force to slide over the bulge 104 to perform the reset. Therefore, the design of the electronic apparatus in this embodiment may prevent an accidental reset of the electronic apparatus when the user touches it carelessly.

Figure 5A:
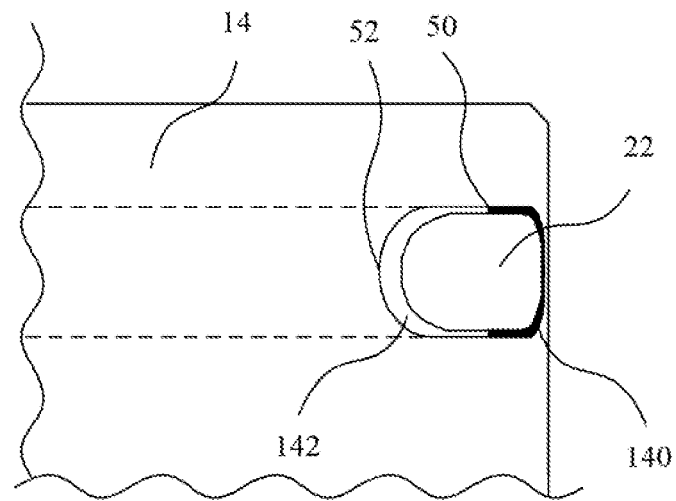
FIG. 5A is an enlarged view of an area enclosed by a dashed line in FIG. 4A according to an embodiment of the present disclosure.
Figure 5B:
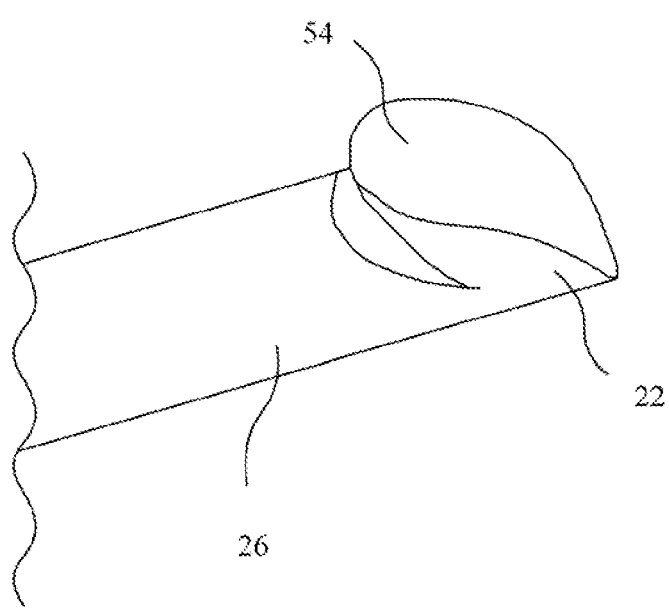
FIG. 5B is an enlarged view of a second stylus body and a stylus rear end of the stylus.

FIG. 5A is an enlarged view of an area enclosed by a dashed line in FIG. 4A according to an embodiment of the present disclosure. FIG. 5B is an enlarged view of a second stylus body and a stylus rear end of the stylus. Referring to FIGS. 5A and 5B at the same time, in an embodiment, a sliding slot 142 is formed on the surface of the protection cover 14 of the main body 1 of the electronic apparatus. The sliding slot 142 includes a first sliding slot end 50 and a second sliding slot end 52. The first sliding slot end 50 is connected to the edge of the placing hole 140, and the second sliding slot end 52 is corresponding to the first sliding slot end 50. A stylus clip 54 is formed on the stylus rear end 22, such that when the stylus 2 is at a first position, the stylus clip 54 leads against the first sliding slot end 50 of the sliding slot 142 and when the stylus 2 moves from the first position to a second position, the stylus clip 54 moves into the second sliding slot end 52 from the first sliding slot end 50. Therefore, the user may determine whether the stylus 2 performs the first is displacement or the second displacement by observing the position of the stylus clip 54 relative to the sliding slot 142.

Figure 6A:
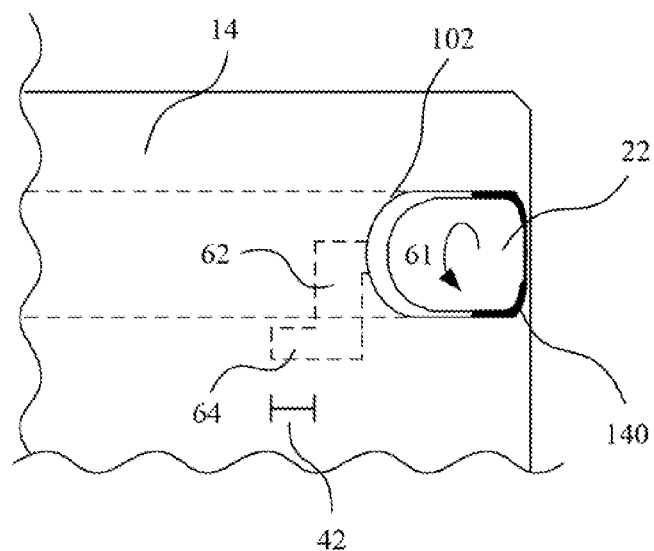
FIG. 6A is an enlarged view of an area enclosed by a dashed line in FIG. 4A according to another embodiment of the present disclosure.
Figure 6B:
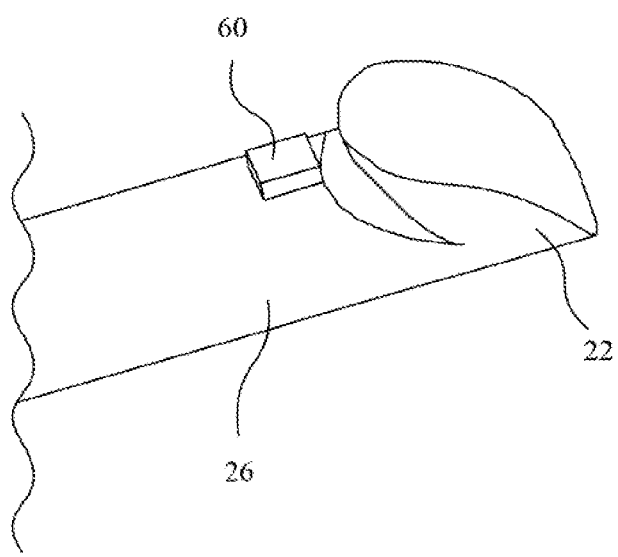
FIG. 6B is an enlarged view of a second stylus body and a stylus rear end of the stylus.

FIG. 6A is an enlarged view of an area enclosed by a dashed line in FIG. 4A according to another embodiment of the present disclosure. FIG. 6B is an enlarged view of a second stylus body and a stylus rear end of the stylus. Referring to FIGS. 6A and 6B at the same time. In another embodiment, the stylus rear end 22 of the stylus 2 further includes a catching bulge 60, the protection cover 14 further includes a side slot 62 contiguous to the second opening 102 of the containing trench 10 and a second displacement slot 64 contiguous to the side slot 62. Therefore, the first displacement 40 in FIG. 4A is performed by aligning the catching bulge 60 with the side slot 62. Before performing the second displacement 42 in FIG. 4B, the stylus 2 must be rotated in a rotation direction 61, such that the catching bulge 60 moves from the side slot 62 to a second displacement slot 64, and the catching bulge 60 moves into the second displacement slot 64 when the second displacement 42 is performed. The distance that the catching bulge 60 moves in the second displacement slot 64 is equivalent to the distance of the second displacement 42.

Therefore, according to this embodiment, when the stylus 2 is not rotated, the stylus 2 cannot perform the second displacement due to the design of the catching bulge 60, thereby further preventing the accidental reset of the electronic apparatus when the users touches it carelessly.

It will be apparent to those skilled in the art that various modifications and variations can be made to the structure of the present invention without departing from the scope or spirit of the invention. In view of the foregoing, it is intended that the present invention cover modifications and variations of this invention provided within the scope of the following claims.

What is claimed is:
1. An electronic apparatus, comprising:
  a main body, comprising:
    a protection cover;
    a containing trench, having a first opening and a second opening and comprising a bulge, wherein the second opening is contiguous to a placing hole of the protection cover; and
    a reset button, separated from the first opening for a certain distance; and
  a stylus, comprising:
    a stylus body, comprising a first stylus body, a second stylus body and a surrounding trench structure, wherein a first end of the surrounding trench structure is connected to the first stylus body, a second end of the surrounding trench structure is connected to the second stylus body, in which the cross section area of the first end is smaller than the cross section of the second end;
    a stylus front end, stretching from the first stylus body to a stylus tip; and
    a stylus rear end, connected to the second stylus body and comprising a catching bulge;
  wherein the stylus front end passes into the containing trench via the second opening to perform a first displacement to a first position such that the bulge buckles in the surrounding trench structure to enable the stylus to be placed inside the containing trench, and then to perform a second displacement to a second position by pressing the stylus rear end to make the surrounding trench structure slide over the bulge such that the stylus tip touches the reset button via the first opening to reset the electronic apparatus, wherein the protection cover further comprises a side slot contiguous to the second opening of the containing trench, and the first displacement is performed by aligning the catching bulge with the side slot, wherein the protection cover further comprises a second displacement slot contiguous to the side slot, and the second displacement is performed after the stylus is rotated to make the catching bulge move to the second displacement slot from the side slot, such that the catching bulge moves into the second displacement slot when the second displacement is performed.

2. The electronic apparatus of claim 1, wherein after the stylus tip at the second position touches the reset button, the stylus is rebounded to the first position by the pressure between the bulge and the second end of the surrounding trench structure.

3. The electronic apparatus of claim 1, wherein a sliding slot is formed on the surface of the protection cover, the sliding slot has a first sliding slot end and a second sliding slot end, the first sliding slot end is connected to the edge of the placing hole, and a stylus clip is formed on the stylus ear end, such that when the stylus is at the first position, the stylus clip leads against the sliding slot and when the stylus moves from the first position to the second position, the stylus clip moves into the second sliding slot end from the first sliding slot end.

4. The electronic apparatus of claim 1, wherein the second end of the surrounding trench structure stretches at a first slope to the first end, and the stylus front end stretches at a second slope from the first stylus body to the stylus tip.

5. The electronic apparatus of claim 4, wherein the first slope is greater than the second slope.

6. The electronic apparatus of claim 1, wherein when the stylus is at the first position, the bulge buckles in the first end of the surrounding trench structure.

7. An electronic apparatus reset method, comprising:
placing a stylus front end of a stylus via a second opening of a containing trench of a main body of the electronic apparatus, wherein the stylus front end stretches from a first stylus body of a stylus body of the stylus to a stylus tip, the main body comprises a protection cover, the second opening is contiguous to a placing hole of the protection cover, and the protection cover further comprises a side slot contiguous to the second opening of the containing trench;
performing a first displacement of the stylus in the containing trench to a first position such that a bulge in the containing trench buckles in a surrounding trench structure of the stylus, wherein a first end of the surrounding trench structure is connected to the first stylus body, a second end of the surrounding trench structure is connected to a second stylus body of the stylus body of the stylus, and the cross section area of the first end is smaller than the cross section area of the second end; and
exerting a force on a stylus rear end connected to the second stylus body of the stylus to make the surrounding trench structure slide over the bulge to perform a second displacement to a second position such that the tip touches a reset button separated from a first opening of the containing trench for a certain distance via the first opening to reset the electronic apparatus, wherein the stylus rear end of the stylus further comprises a catching bulge, the performing of a first displacement further comprises aligning the catching bulge with the side slot, wherein the protection cover further comprises a second displacement slot contiguous to the side slot, the catching bulge moves into the second displacement slot when the second displacement is performed, and before exerting the force on the stylus rear end again to perform the second displacement, the electronic apparatus reset method further comprises;
rotating the stylus to make the catching bulge move from the side slot to the second displacement slot.

8. The electronic apparatus reset method of claim 7, after the stylus tip touches the reset button to reset the electronic apparatus, further comprising:
making the stylus rebound to the first position by the pressure between the bulge and the second end of the surrounding trench structure.

9. The electronic apparatus reset method of claim 7, wherein a sliding slot is formed on the surface of the protection cover, the sliding slot has a first sliding slot end and a second sliding slot end, the first sliding slot end is connected to the edge of the placing hole, and a stylus clip is formed on the stylus rear end, such that when the stylus is at the first position, the stylus clip leads against the sliding slot and when the stylus moves from the first position to the second position, the stylus clip moves to the second sliding slot end from the first sliding slot end.

10. The electronic apparatus reset method of claim 7, wherein the second end of the surrounding trench structure stretches at a first slope to the first end, and the stylus front end stretches at a second slope from the first stylus body to the stylus tip.

11. The electronic apparatus reset method of claim 10, wherein the first slope is greater than the second slope.

12. The electronic apparatus reset method of claim 7, wherein when the stylus is at the first position, the bulge buckles in the first end of the surrounding trench structure.

* * * * *